(12) United States Patent
Druyan

(10) Patent No.: US 8,371,470 B2
(45) Date of Patent: Feb. 12, 2013

(54) CONTAINER FOR DISPENSING LIQUID DOSES

(76) Inventor: Eugene Druyan, Thornhill, CA (US)

( * ) Notice: Subject to any disclaimer, the term of this patent is extended or adjusted under 35 U.S.C. 154(b) by 347 days.

(21) Appl. No.: 12/679,596

(22) PCT Filed: Sep. 24, 2008

(86) PCT No.: PCT/CA2008/001682
§ 371 (c)(1),
(2), (4) Date: Mar. 23, 2010

(87) PCT Pub. No.: WO2009/039632
PCT Pub. Date: Apr. 2, 2009

(65) Prior Publication Data
US 2010/0193526 A1    Aug. 5, 2010

Related U.S. Application Data

(60) Provisional application No. 60/974,816, filed on Sep. 24, 2007.

(51) Int. Cl.
| B65D 83/00 | (2006.01) |
| B65D 1/24 | (2006.01) |
| B65D 25/04 | (2006.01) |
| B65D 81/38 | (2006.01) |
| A47J 41/00 | (2006.01) |

(52) U.S. Cl. ............. 220/501; 220/592.01; 220/592.16; 220/592.17; 220/592.2; 222/14; 222/56; 222/58; 222/59

(58) Field of Classification Search .............. 220/501, 220/529, 592.01, 592.16, 592.17, 592.2, 220/703, 711, 713; 215/387, 388, 389; 222/14, 222/56, 58, 59
See application file for complete search history.

(56) References Cited

U.S. PATENT DOCUMENTS

| 267,296 A | 11/1882 | Wilder |
| 1,270,262 A | 6/1918 | Buckland |
| 1,952,558 A | 3/1934 | Miller |
| 2,373,551 A | 4/1945 | De Lauder |
| 2,693,301 A | 11/1954 | Allen Jr. |
| 3,172,580 A | 3/1965 | MacKey |
| 3,224,652 A | 12/1965 | Ladwig et al. |
| 3,412,892 A | 11/1968 | Waksman et al. |
| 4,083,146 A | 4/1978 | Brankovic |
| 4,235,348 A | 11/1980 | Watson |
| 4,424,921 A | 1/1984 | Feuerstein et al. |
| 4,438,865 A | 3/1984 | Scattaregia |
| 4,828,149 A | 5/1989 | Hester |
| 4,921,112 A | 5/1990 | Juhlin et al. |
| 5,018,636 A | 5/1991 | Ross |
| 5,067,637 A | 11/1991 | Aurness et al. |

(Continued)

FOREIGN PATENT DOCUMENTS

| CA | 2219618 A1 | 10/1997 |
| CA | 2311058 A1 | 7/2000 |

(Continued)

*Primary Examiner* — Anthony Stashick
*Assistant Examiner* — Madison L Poos
(74) *Attorney, Agent, or Firm* — Jansson Munger McKinley & Shape Ltd.

(57) ABSTRACT

The present invention relates to spill resistant container for dispensing liquid doses wherein the container includes a body of generally hollow form about a center vertical axis with open ends, comprising: a liquid deposit chamber having an open first end and an opposing closed second end, a liquid withdrawal chamber having an open first end and an opposing closed second end, one or more apertures between said deposit and withdrawal chambers adapted to selectively permit liquid communication in controlled doses from the liquid deposit chamber to the liquid withdrawal chamber, a detachable base cap having a cavity in liquid communication with the liquid deposit and withdrawal chambers.

16 Claims, 9 Drawing Sheets

U.S. PATENT DOCUMENTS

| | | |
|---|---|---|
| 5,102,000 A | 4/1992 | Feltman, III |
| 5,150,816 A | 9/1992 | DeCastro |
| 5,249,703 A | 10/1993 | Karp |
| 5,323,928 A | 6/1994 | Stevens |
| 5,405,055 A | 4/1995 | Hester |
| 5,454,470 A | 10/1995 | Bricker |
| 5,497,916 A | 3/1996 | Hester |
| 5,570,797 A | 11/1996 | Yeh |
| 5,579,946 A | 12/1996 | Rowan et al. |
| 5,823,380 A | 10/1998 | Cox |
| 5,964,379 A | 10/1999 | DeMars |
| 6,076,699 A | 6/2000 | Seager et al. |
| 6,161,720 A | 12/2000 | Castle |
| 6,471,085 B1 | 10/2002 | Gallo |
| 6,520,369 B1 | 2/2003 | Cytacki |
| 6,568,557 B2 | 5/2003 | Fusco et al. |
| 6,571,973 B1 | 6/2003 | Tripsianes |
| 6,755,318 B2 | 6/2004 | Burke et al. |
| 6,783,020 B2 | 8/2004 | Featherston et al. |
| 7,032,788 B2 | 4/2006 | Moreau et al. |
| 7,080,752 B2 | 7/2006 | Bergeron |
| 7,290,684 B1 | 11/2007 | Ellion |
| 7,946,126 B2 | 5/2011 | Blankman et al. |
| 2005/0178775 A1 | 8/2005 | Burke et al. |
| 2008/0264960 A1 | 10/2008 | Phillips et al. |

FOREIGN PATENT DOCUMENTS

| | | |
|---|---|---|
| CA | 2425200 A1 | 4/2002 |
| CA | 2428592 A1 | 5/2002 |

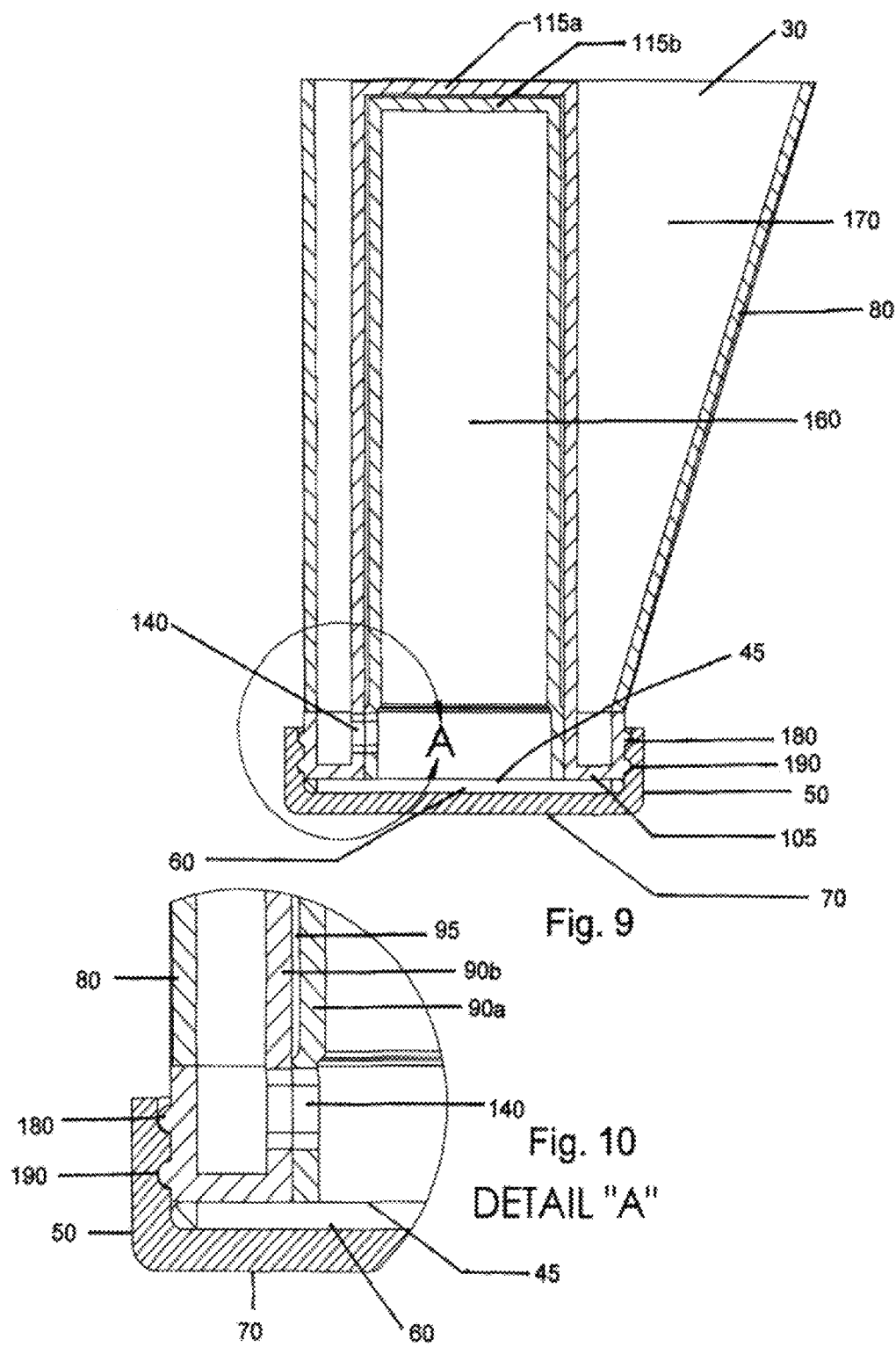

CONTAINER FOR DISPENSING LIQUID DOSES

RELATED APPLICATIONS

This application claims the benefit of U.S. Provisional Patent Application Ser. No. 60/974,816, filed Sep. 24, 2007 and PCT International Application No. PCT/CA2008/001682, filed Sep. 24, 2008, the contents of which are incorporated herein.

FIELD OF THE INVENTION

The present invention relates to the field of vessels or containers for liquids or beverages. More specifically, the present invention relates to the field of spill resistant, controlled sip or volume dosing containers, including containers which moderate the temperature of a beverage portion before withdrawal from the container.

BACKGROUND OF THE INVENTION

A spill resistant drinking container is highly desirable in applications where there is an increased probability of spillage during drinking, such as in hospitals and nursing homes with debilitated patients, training cups for children, and in moving vehicles such as airplanes, boats, ships, trains and automobiles.

Volume dosing is desirable in containers for hot beverages. A hot beverage, such as coffee, consumed at a temperature of greater than 80 degree Celsius has the potential to scald or otherwise damage the mouth and lips of a consumer. Solutions to this problem have included stirring the beverage or waiting for thermal radiation to decrease the beverage temperature to a comfortable level to allow consumption. Additionally, ice or a cooler consumable liquid such as water or milk is added to decrease the beverage temperature. Unfortunately, upon cooling a beverage to a comfortable consumption temperature, the beverage temperature quickly decreases until a hot beverage is below the optimal consumption temperature.

A similar situation exists with cold beverages that have the potential to irritate sensitive dental structures or chill portions of the digestive tract to cause temporary cramps or pain.

Volume dosing containers are also desirable for a user having difficulty in swallowing, which is referred to as dysphagia. There are currently millions of people diagnosed with dysphagia. A patient suffering from dysphagia may encounter medical complications, such as aspiration. Sometimes, when liquids enter the windpipe of a person who has dysphagia, coughing or throat clearing cannot remove it. Liquid that stays in the windpipe may enter the lungs and create a chance for harmful bacteria to grow. A serious infection (aspiration pneumonia) can result. Dysphagia patients are therefore often put on restricted diets and asked to take small sips of liquid to prevent aspiration into their lungs.

Many currently available children training cups are criticized for not being properly designed to train children to sip because of the valves used in such cups. While the valves prevent spillage, they make the children suck the beverage instead of sip it, which defeats the purpose of the training cup. In addition, many cups have a hard spout that increases risk of injury to the children's mouth and teeth when they carry the cup around.

Travel beverage containers or mugs for hot beverages are known. Canadian Patent Application No. 2386384 discloses a beverage container with valve activated temperature moderated chamber. Examples of a "desk" mug with temperature insulated and temperature moderated container are disclosed in U.S. Pat. No. 5,823,380 and a limited flow cup is disclosed in Canadian Patent Application No. 2428592.

Known travel mug designs typically include complex structures of valves and/or pump components and do not provide sip or volume dosing.

Known spill/splash proof lid solutions include application and patents CA2219618, U.S. Pat. No. 5,102,000, CA2311058, U.S. Pat. No. 6,076,699, CA2425200, U.S. Pat. No. 5,570,797, U.S. Pat. No. 5,150,816, U.S. Pat. No. 5,249,703, U.S. Pat. No. 6,568,557, and U.S. Pat. No. 4,438,865. In such cups, the lid is usually equipped with some type of valve that allows the user to drink from the cup without removing the entire lid, or flow control solution. Tipping proof solutions are also as known; see for example U.S. Pat. No. 5,454,470 and U.S. Pat. No. 6,520,369.

The spill resistant container of the present invention permits dosing a liquid into small portions (the size of a sip). In the case of hot beverages, the small portion is isolated from the rest of the hot beverage, so that it quickly cools to a comfortable drinking temperature. The container keeps the majority of the beverage hot and prevents spillage. The container of the present invention is spill resistant, has no valves, pumps or springs, resulting in ease of use and less costly manufacturing costs.

SUMMARY OF THE INVENTION

The present invention advantageously provides a spill resistant container for dispensing liquid doses that is of relatively simple and inexpensive construction as compared to devices of similar functionality of the prior art.

The invention provides a container for dispensing liquid doses wherein the container includes a body of generally hollow form about a centre vertical axis with open ends, comprising: a liquid deposit chamber having an open first end and an opposing closed second end, a liquid withdrawal chamber having an open first end and an opposing closed second end, one or more apertures between said deposit and withdrawal chambers adapted to selectively permit liquid communication in controlled doses from the liquid deposit chamber to the liquid withdrawal chamber, a detachable base cap having a cavity in liquid communication with the liquid deposit and withdrawal chambers. The liquid withdrawal chamber may be internal of the deposit chamber.

In one aspect, the liquid withdrawal chamber comprises a frusto-conical shaped first cup forming a dosing chamber dimensioned to contain a predetermined amount of liquid, wherein the dosing chamber extends below the liquid deposit chamber. The dosing chamber has a first aperture on the end wall thereof and a second aperture on the side wall thereof. The base cap cavity is in liquid communication with the first aperture and the liquid deposit chamber is in liquid communication with the second aperture. The first and second apertures that may be circular or slits are in spaced apart relationship to define, in use, a pre-determined liquid dose.

In another aspect, the first aperture is circular and said second aperture is a slit positioned along the centre vertical axis of said first cup.

In a further aspect, the first aperture is circular and second aperture is a slit angled from the centre vertical axis of said first cup.

In a further aspect, a second cup is rotatably mountable to the end of the dosing chamber. The second cup has a first circular aperture on the end wall thereof in axial alignment with the first aperture of the dosing chamber and a second slitted aperture angled from the centre vertical axis of the second cup. The second aperture is angled relative to the slit of the dosing chamber, whereupon rotation of the second cup, the slitted apertures define a moveable orifice for setting a predetermined volume of a liquid dose, typically 5.0 ml. to 50 ml.

In a further aspect container comprises a body having an outer side wall, an inner side wall positioned within the outer side, said inner side wall adjoins the outer side wall at the outer top edge region of the body and slopes in opposite direction with respect to the vertical to form a closed end cup extending below the outer side wall at the bottom region of the body, wherein an inner chamber with an open end at the top of the body and an outer chamber with an opposing open end are defined by the outer and inner walls, said cup having one or more apertures, a detachable base cap having a cavity in liquid communication with said inner and outer chambers, wherein said aperture is adapted to selectively permit fluid communication from the outer chamber to the inner chamber.

In a further aspect the container includes a body of generally hollow form about a centre vertical axis with open ends, comprising: an liquid deposit chamber having an open first end and an opposing closed second end, a liquid withdrawal chamber having an open first end and an opposing closed second end, one or more apertures between said deposit and withdrawal chambers adapted to selectively permit liquid communication in controlled doses from the liquid deposit chamber to the liquid withdrawal chamber, a detachable base cap having a cavity in liquid communication with the liquid deposit and withdrawal chambers. The liquid deposit chamber is internal the liquid withdrawal chamber.

Other advantages, features and characteristics of the present invention, as well as methods of operation and functions of the related elements of the structure, and the combination of parts and economies of manufacture, will become apparent upon consideration of the following detailed description and the appended claims with reference to the accompanying drawings, the latter of which are briefly described hereinafter.

BRIEF DESCRIPTION OF THE DRAWINGS

The present invention may be further understood by reference to the description of the invention, taken in conjunction with the accompanying drawings, in which:

FIG. 1 is the container in the upright or dosing position.

FIG. 2 is the container in the upright position.

FIG. 3 is the container in the inverted or fill position.

FIG. 4 is the container in an inverted position.

FIG. 7 is the container in the upright or dosing position.

FIG. 9 is a cross-sectional view of a container according to the alternative embodiment shown in FIG. 7.

FIG. 10 is an enlarged detail of portion A in FIG. 9.

DETAILED DESCRIPTION OF THE INVENTION

The description, which follows, and the embodiments described therein, is provided by way of illustration of an example, or examples of particular embodiments of principles and aspects of the present invention. These examples are provided for the purposes of explanation, and not of limitation, of those principles and of the invention.

Figure 1:
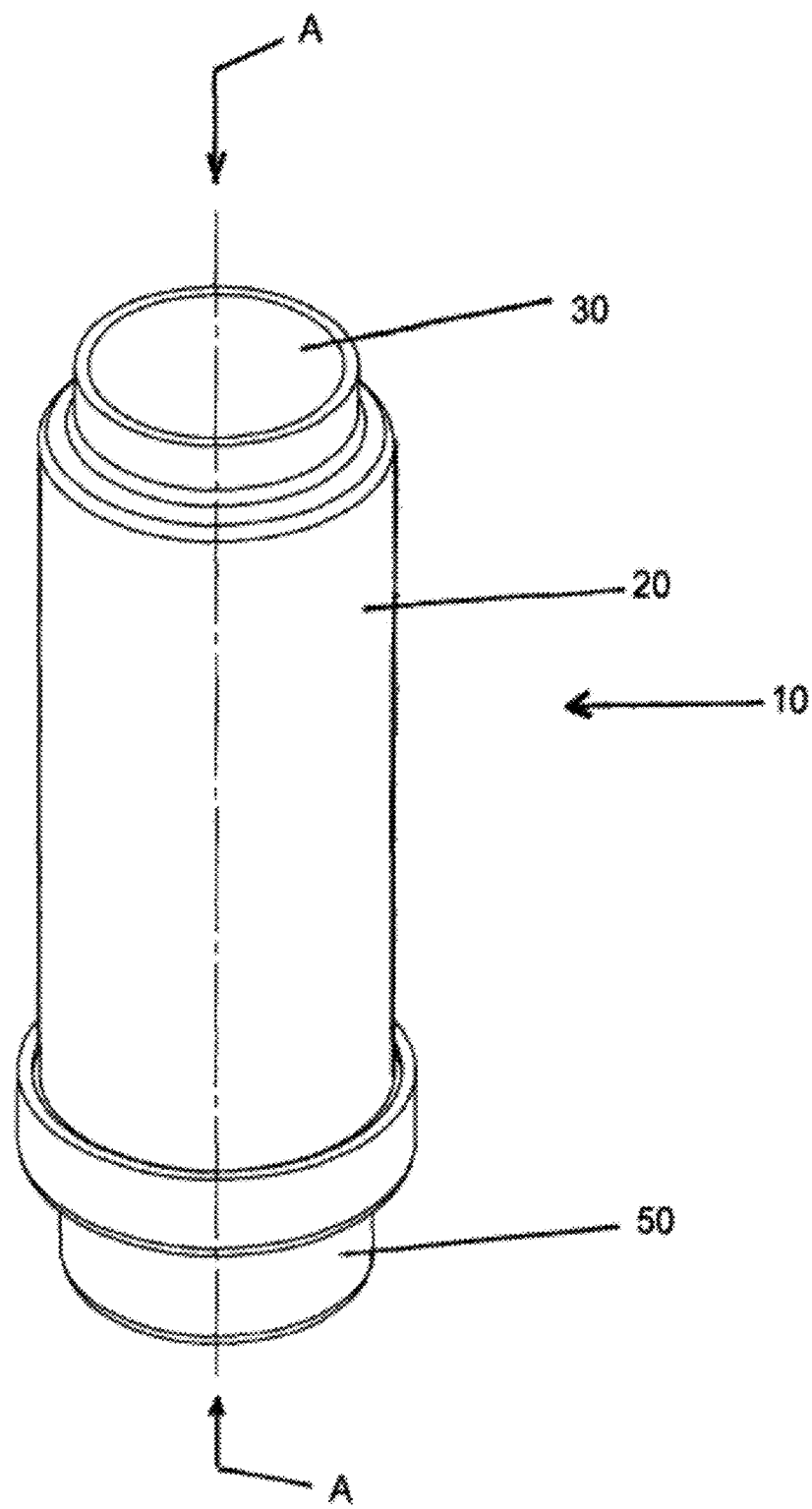
FIG. 1 is a perspective view of a container according to one embodiment of the invention.
Figure 2:
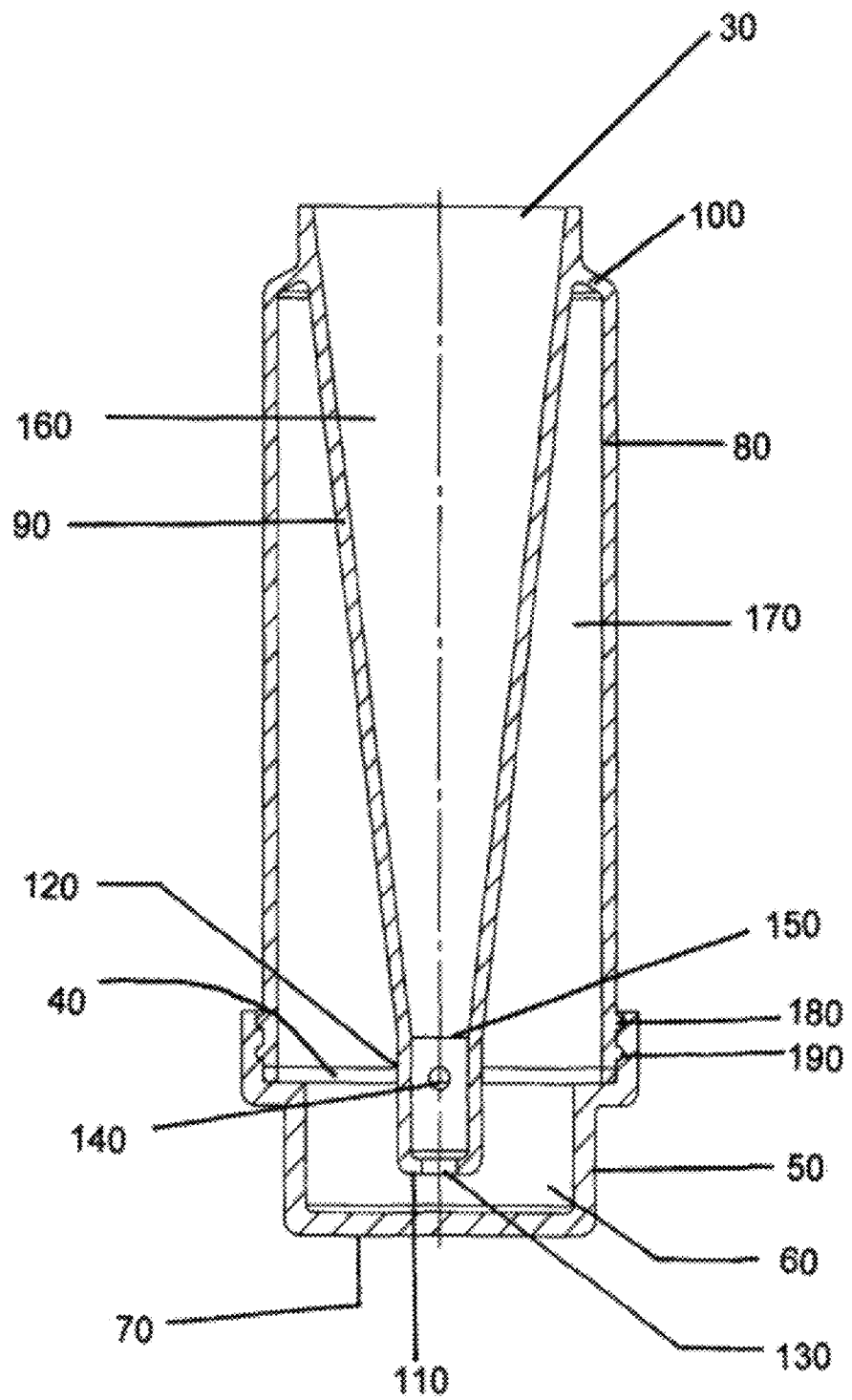
FIG. 2 is a cross-sectional view of the container of FIG. 1 along line A-A of FIG. 1.
Figure 3:
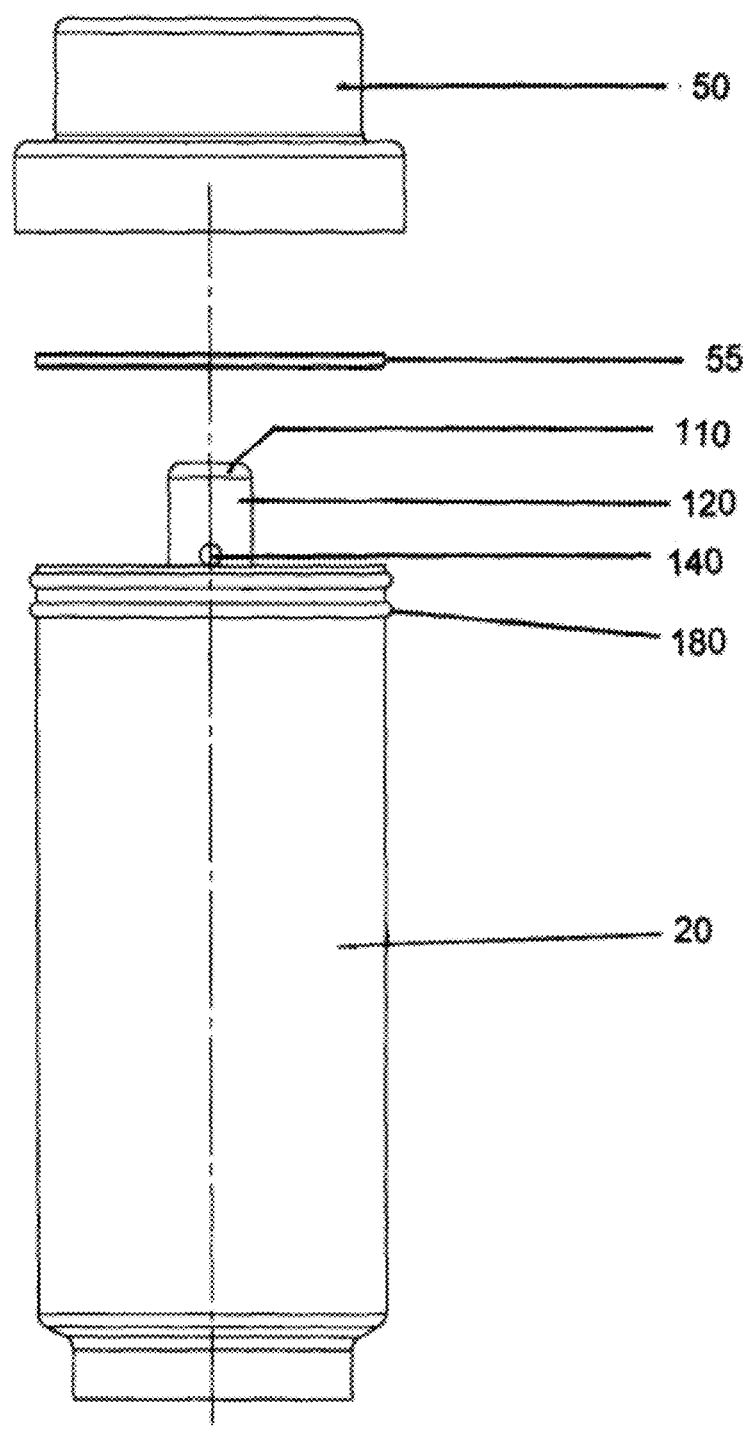
FIG. 3 is an exploded elevation view of the container of FIG. 1.

Referring to FIGS. 1, 2, and 3 a container 10, shown in a first or upright position, includes a body 20 of generally hollow form about a vertical axis with an open top end 30 and open bottom end 40 and a base cap 50 constructed to define a cavity 60 for holding liquid and to sealingly engage with body 20. As shown, the cap 50 includes a generally flat base 70. Optionally, a seal 55 may also be used.

The body 20 includes an outer side wall 80 and an inner side wall 90. The inner side wall 90 is shown having a generally frusto-conical shape but may equally be generally cylindrically or substantially cone shaped. The inner side wall 90 is positioned within the outer side wall and is sloped in opposite direction with respect to the vertical, such that inner wall 90 adjoins the outer side wall 80 at the outer top edge region 100 of the body 20 and at the opposing end forms a short, generally cylindrically shaped cup portion or dosing chamber 120 having a closed bottom end wall 110. The cup 120 extends axially beyond the outer side wall 80. The cup 120 has a first aperture 130 in bottom cup end wall 110 in air communication with cavity 60 and a second aperture 140 on the side wall of cup 120 in the area adjacent cup base portion 150. Apertures 140 and 130 are shown as circular but may be slits. In any configuration, the apertures are dimensioned generally according to the surface tensions of the liquids for which the container may be directed. The outer side wall 80 and inner side wall 90 thereby define an inner hollow space or chamber 160 and an outer hollow space or chamber 170. The inner chamber 160 has an open end 30 at the top of body 20 and a bottom end wall 110. The outer chamber 170 has an open end 40 at the bottom end of body 20 and is closed at the outer top edge region 100 of the body 20. The outer chamber 170 is in air communication with aperture 140. The outer side wall 80 in the area directly adjacent open end 40 includes a series of external screw threads 180. Screw threads 180 are connectable with the series of internal screw threads 190 formed on the base cap. Engagement of cap 50 to body 20 may be by threaded arrangement as shown, by friction fit (not shown), or other known manner of sealing engagement.

The volume of a single liquid dose is pre-determined by the volume of cup 120 and the relative position of second aperture 140 on the side wall of cup 120. The liquid dose volume will be less if aperture 140 is positioned closer to bottom end wall 110. For dysphagia applications, the dose volume is typically 5 ml. to 20 ml. For travel container application, the dose volume is typically 20 ml. to 50 ml.

In operation, cap 50 is disengaged from body 20 and body 20 is rotated 180 degrees from the first position to a second or inverted position so that open end 40 of outer chamber 170 becomes an interim top opening of body 20. Liquid or fluid is poured into outer chamber 170 to any desired level up to the edge of open end 40 and cap 50 is reattached to body 20.

Container 10 is then rotated 180 degrees to return to the first position. As container 10 rotates, liquid fills cavity 60 and air from inner chamber 160 enters into outer chamber 170 through aperture 140. The entering air causes liquid in outer chamber 170 to flow through aperture 130 into cup 120 until the level of liquid in cup 120 prevents air entering aperture 140. Once air stops entering aperture 140, no further air enters the outer chamber 170 and no further liquid flows into cup 120. The amount of liquid in cup 120 represents a pre-determined, controlled dose of liquid that the user may drink through open first end 30 by tilting container 10.

Additional controlled doses of liquid equal to the first dose are obtainable by withdrawing liquid from inner chamber 160 by tilting the container and drinking from open end 30 or without tilting via use of a straw, followed by rotation of container 10 to the first position. Such process results in another equal dose of liquid for further consumption by the user. These process steps and controlled dosing are repeatable until no liquid remains in outer chamber 170.

Figure 4:
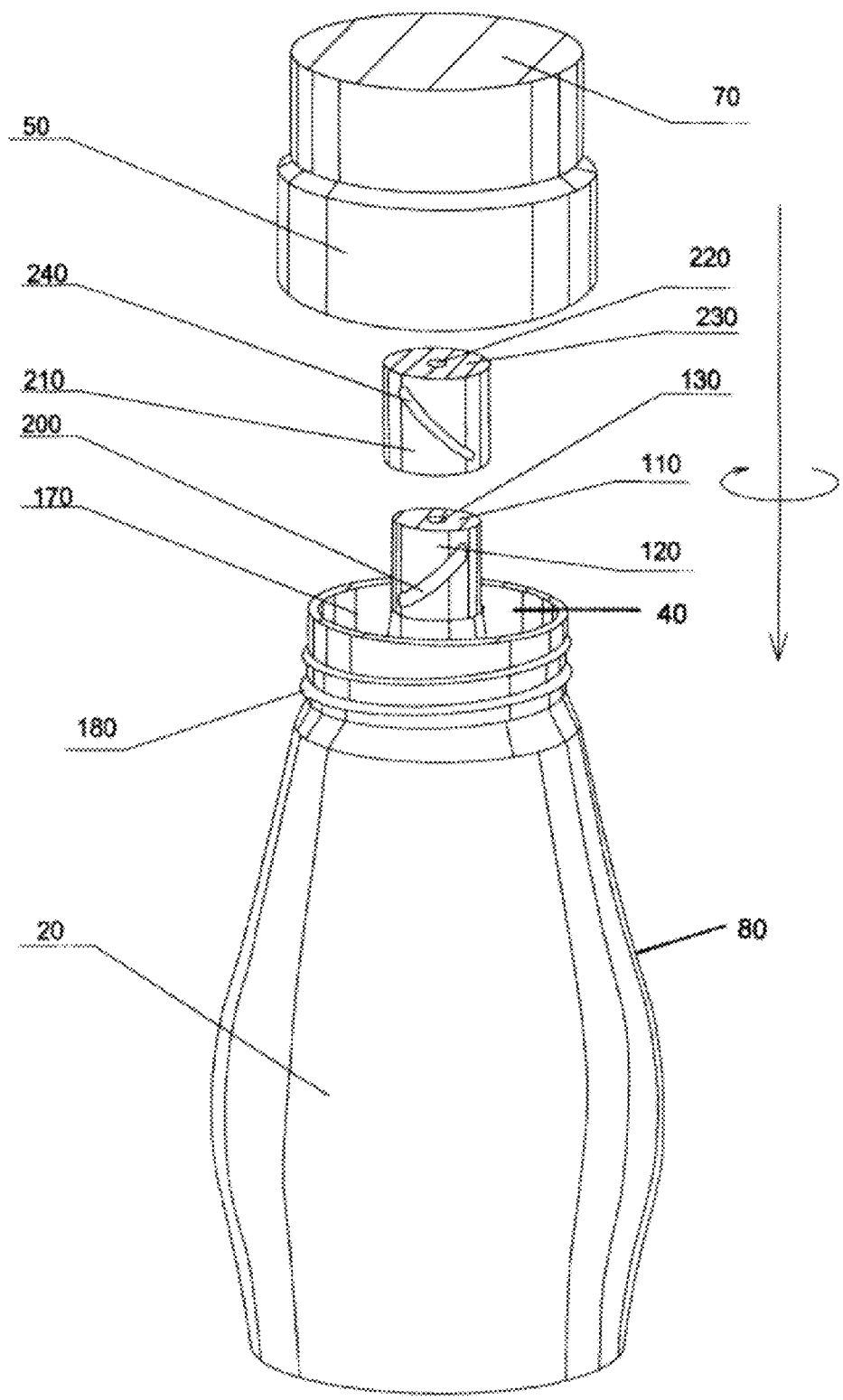
FIG. 4 is an exploded perspective view of a container according to an alternative embodiment showing a second cup.
Figure 5:
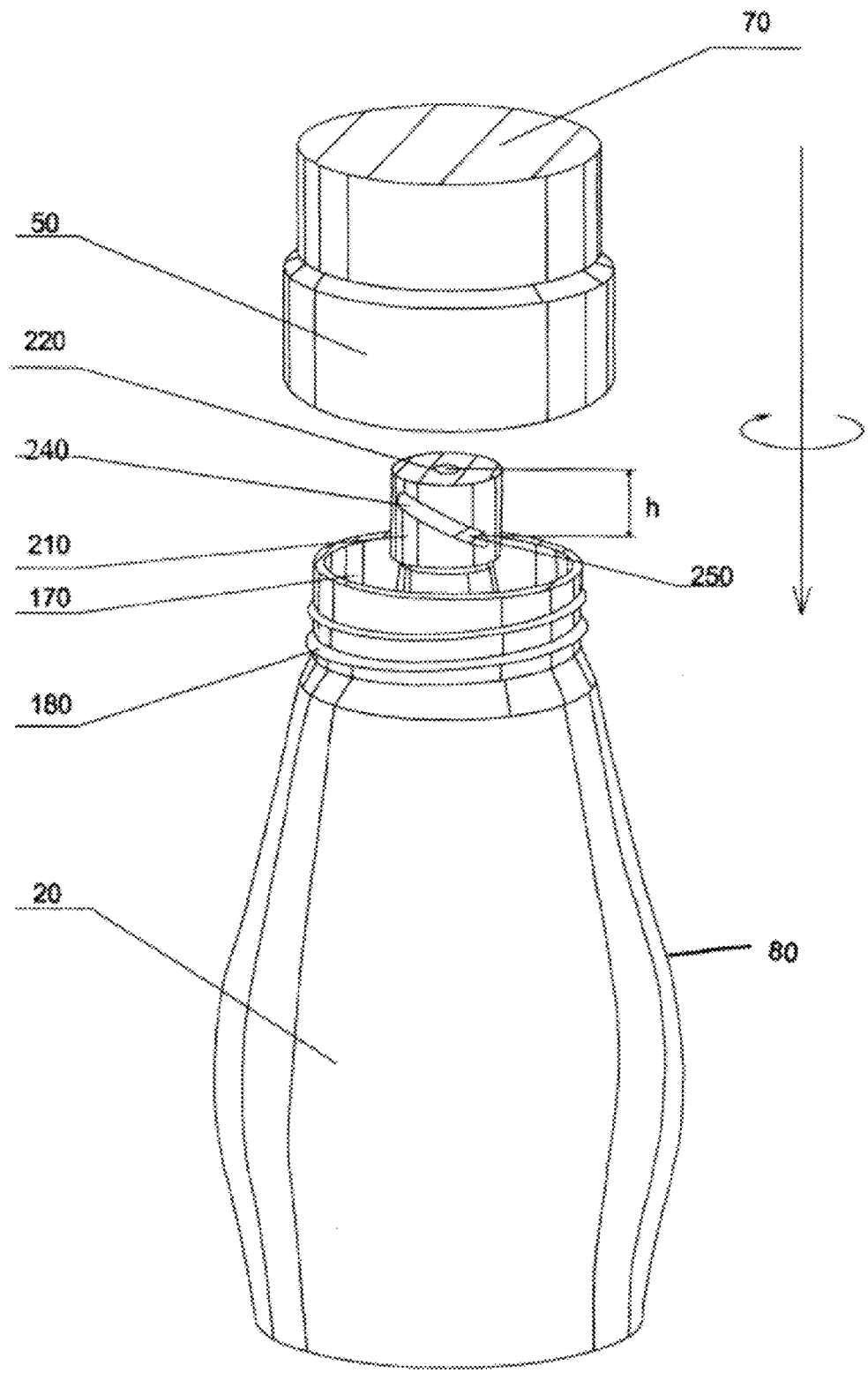
FIG. 5 is a partially exploded perspective view of the container of FIG. 4 with a second cup in one adjustment position.
Figure 6:
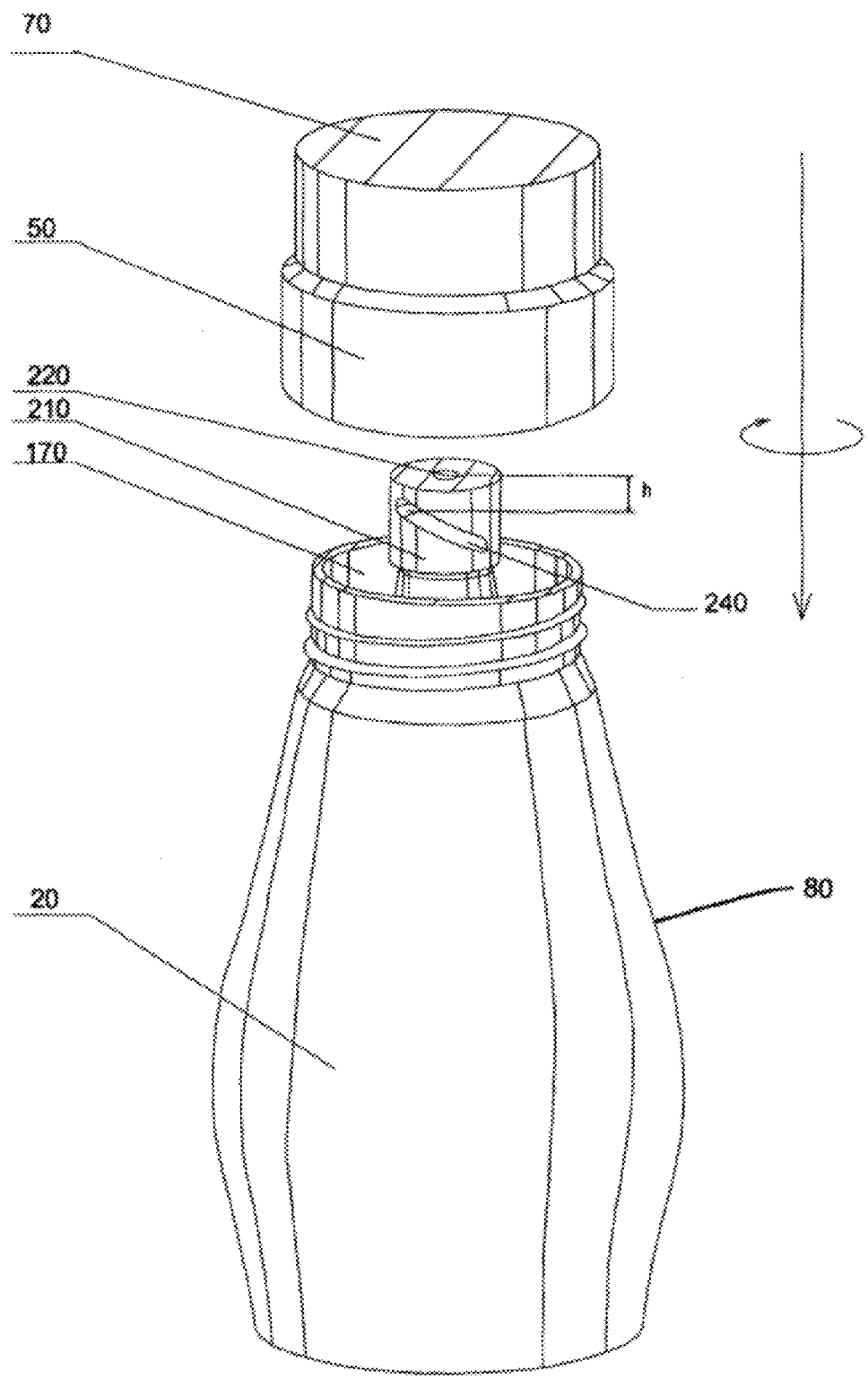
FIG. 6 is a partially exploded perspective view of the container of FIG. 4 with a second cup in another adjustment position.
Figure 7:
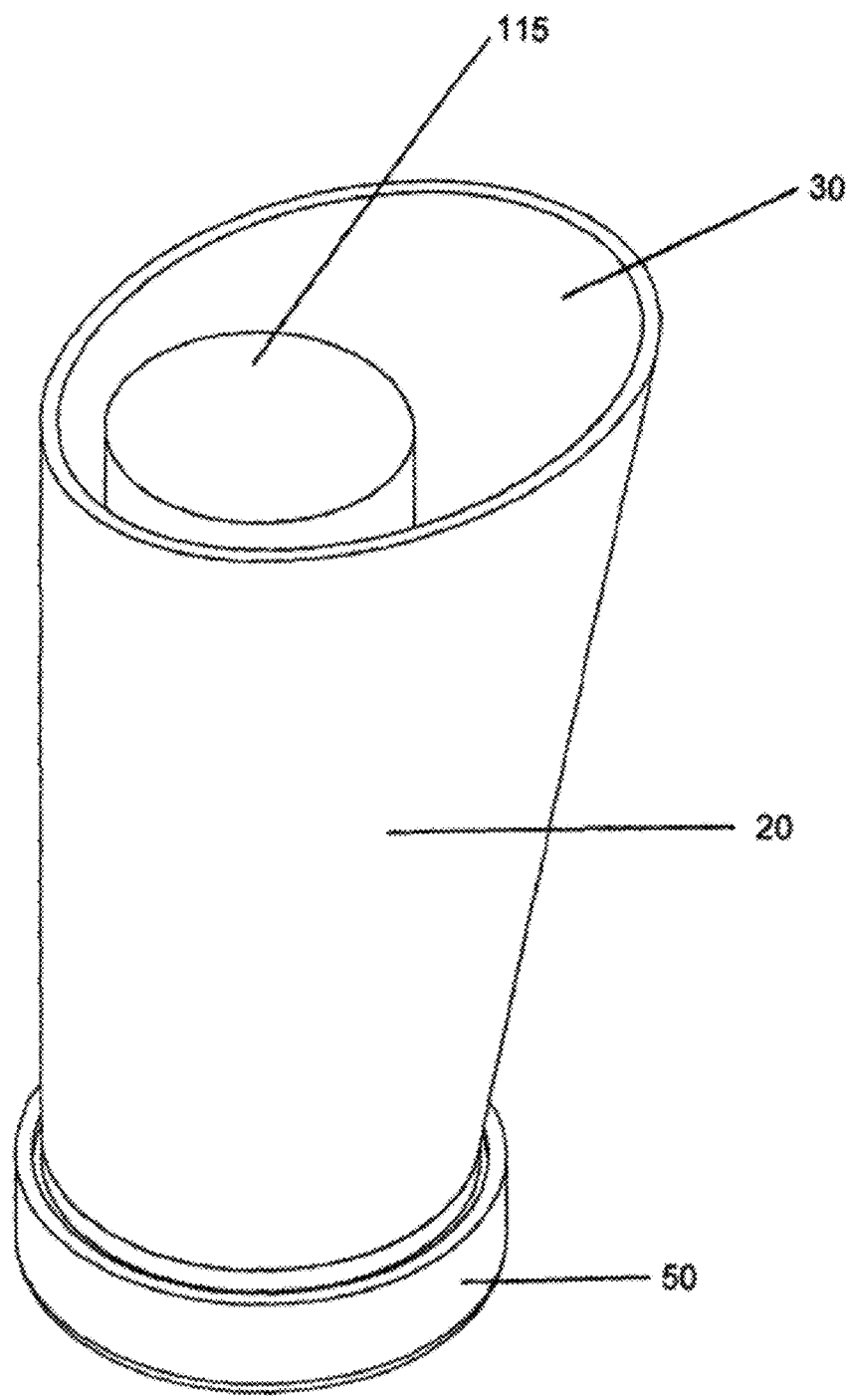
FIG. 7 is a perspective view of a container according to another embodiment of the invention.
Figure 8:
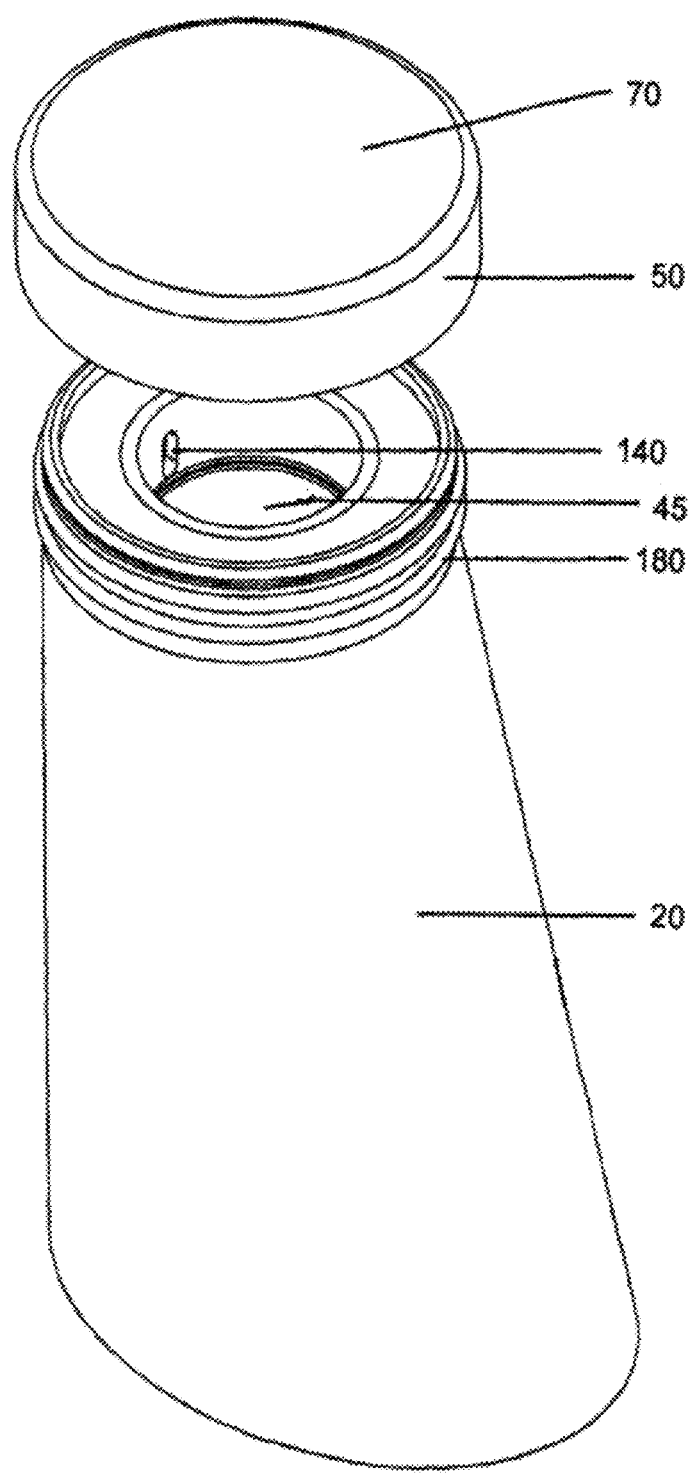
FIG. 8 is a partially exploded perspective view of the container of FIG. 7 in the inverted or fill position.

FIGS. 4, 5, and 6 show an alternative embodiment wherein the liquid volume dose may be adjusted by the user. The container shown in the inverted position includes a body 20 of generally hollow form about a vertical axis with an open end 30 (not visible) at the top of container 10 and open end 40 at the bottom of the container. A base cap 50 is adapted to sealingly engage body 20. As shown, the cap 50 includes a generally flat base 70. The liquid cavity 60 of base cap 50 is not visible in this figure. The outer side wall 80 in the area directly adjacent open end 40 includes a series of external screw threads 180. Screw threads 180 are connectable with the series of internal screw threads 190 formed on the base cap.

In this embodiment, the body 20 of the container has an inner chamber 160 (not visible) and an outer chamber 170 defined in the same manner as the embodiment shown in FIGS. 1, 2 and 3. The inner side wall 90 (not visible) includes a short, generally cylindrically shaped cup portion or dosing chamber 120 having a closed bottom end wall 110 that extends axially beyond the outer side wall 80. Cup 120 has an aperture 130 in bottom end wall 110 and an angled slitted aperture 200 on the side wall of cup 120. A second cylindrically shaped cup 210 dimensioned to rotatably engage over cup 120 includes a first circular aperture 220 on the second cup end wall 230 and a second angled, slitted aperture 240 on the side wall of second cup 210. The angle of slitted aperture 240 is approximately perpendicular relative to the angle of slitted aperture 200.

With cap 50 detached and second cup 210 in fitted arrangement over cup 120, circular aperture 220 of second cup 210 aligns with circular aperture 130 of cup 120 such that inner chamber 160 is in liquid communication with cavity 60. As second cup 210 is rotated about its axis, slitted aperture 240 intersects with slitted aperture 200 to define an intersecting aperture 250 having a distance "h" from the second cup bottom end wall 230. Inner chamber 160 is thereby in fluid communication with outer chamber 170 via intersecting aperture 250.

Continued rotation of second cup 210 about its axis results in the re-position of intersecting aperture 250 relative to the end wall of second cup 210 and cup base portion 150, namely increasing or decreasing distance "h". A lower "h" value corresponds to a smaller volume of dosed liquid and a higher "h" value corresponds to a larger volume of dosed liquid. The side wall of second cup 210 may optionally have volume amounts along the outer edge of slitted aperture 240.

FIGS. 7, 8, 9, and 10 show a further alternative embodiment wherein the liquid deposit chamber 160 is internal of the liquid withdrawal chamber 170. The body 20 has a skewed frusto-conical shape and includes an outer side wall 80 and an inner side wall 90 of vacuum walled construction comprised of walls 90a and 90b with a vacuum space 95 therebetween. This vacuum wall construction thermally insulates liquid in the liquid deposit chamber. Outer side wall 80 is substantially vertical on one side and slopes outwardly with respect to the vertical on the opposing side. The inner wall 90 adjoins the outer side wall 80 at the bottom edge region 105 of the body 20 and at the opposing end forms a generally cylindrically liquid deposit chamber 160 having a closed top end 115 comprised of walls 115a and 115b. The deposit chamber 160 has an aperture 140 on the side wall of chamber 160 in the area adjacent open end 45. Aperture 140 may be a slit as shown or may be circular. In any configuration, the aperture is dimensioned generally according to the surface tensions of the liquids for which the container may be directed.

The outer side wall 80 and inner side wall 90 thereby define an inner hollow space or chamber 160 and an outer hollow space or chamber 170. The outer chamber 170 has an open end 30 at the top of body 20 and a closed opposing end at bottom edge region 105. The inner chamber 160 has an open end 45 at the bottom end of body 20 and is closed at top wall 115. The outer chamber 170 is in liquid communication with aperture 140. The outer side wall 80 in the area directly adjacent bottom edge region 105 includes a series of external screw threads 180. Screw threads 180 are connectable with the series of internal screw threads 190 formed on the base cap. Engagement of cap 50 to body 20 may be by threaded arrangement as shown, by friction fit (not shown), or other known manner of sealing engagement.

In operation, cap 50 is disengaged from body 20 and body 20 is rotated 180 degrees from the first position to a second or inverted position so that open end 45 of inner chamber 160 becomes an interim top opening of body 20. Liquid or fluid is poured into inner chamber 160 to any desired level up to the bottom of aperture 140 and cap 50 is reattached to body 20.

Container 10 is then rotated 180 degrees to return to the first position. As container 10 rotates, air from outer chamber 170 enters into inner chamber 160 through aperture 140. The entering air causes liquid in inner chamber 160 to flow through aperture 140 into outer chamber 170 until the level of liquid prevents air entering aperture 140. Once air stops entering aperture 140, no further air enters the inner chamber 160 and no further liquid flows into outer chamber 170. The amount of liquid in outer chamber 170 represents a pre-determined, controlled dose of liquid that the user may drink through open first end 30.

Additional controlled doses of liquid equal to the first dose are obtainable by withdrawing liquid from outer chamber 170 by tilting the container and drinking from open end 30 or without tilting via use of a straw.

A typical construction of the container and its elements of the present invention would normally be a rigid plastic material but other materials may be equally suitable for different applications. The container may be constructed of ceramic, porcelain, glass, metal, clay, paper, or combinations thereof.

The container may optionally be constructed of thermal insulating materials or have vacuum walls to maintain the contained liquid at a desired temperature (either hot or cold).

The container may also optionally have one or more external handles mounted or pre-formed on the external body wall.

It will be understood that various changes, modifications and adaptations may be made by those having ordinary skill in the art without departing from the spirit of the invention or the scope thereof as set out by the claims that follow.

The embodiments of the invention in which an exclusive property or privilege is claimed are defined as follows:

1. A container for dispensing a predetermined volume of liquid wherein when the container is an upright position it comprises:

a liquid deposit chamber having a closed top end and an open bottom end;

a liquid withdrawal chamber in nested relationship with the liquid deposit chamber having an open top end and a closed bottom end;

a detachable base cap that seals the bottom end of the liquid deposit chamber, the cap having a cavity that allows liquid to pass between the liquid deposit and withdrawal chambers;

an air flow aperture in the withdrawal chamber for air to flow from the withdrawal chamber into the deposit chamber, and;

a liquid flow aperture in the withdrawal chamber for liquid to flow from the deposit chamber into the withdrawal chamber, wherein said air flow aperture is located in a side wall of the withdrawal chamber, wherein when the container is inverted from the upright position to a fill position, the cap can be detached from the deposit chamber so that the deposit chamber can be filled with liquid, wherein after re-attaching the cap, the container is inverted from the fill position to the upright position, air flows from the withdrawal chamber to the deposit chamber and liquid flows from the deposit chamber into the withdrawal chamber until the level of liquid in the withdrawal chamber prevents air flow into the deposit chamber, thereby dispensing a predetermined volume of liquid into the withdrawal chamber.

2. A container of claim 1 wherein the withdrawal chamber is internal of the deposit chamber.

3. A container of claim 2 wherein the withdrawal chamber is substantially frustoconical in shape.

4. The container of claim 2 wherein the withdrawal chamber extends below the open end of the liquid deposit chamber to form a dosing chamber inside the base cap.

5. The container of claim 2 wherein said liquid flow aperture is in the bottom end of the withdrawal chamber, and when the container is inverted from the fill position to the upright position, air flows through the aperture in the side wall into the deposit chamber and liquid flows through the aperture in the bottom end into the withdrawal chamber until the level of liquid in the withdrawal chamber prevents air flow into the deposit chamber.

6. The container of claim 2 further comprising a rotatable cup mounted to the bottom end of the withdrawal chamber that permits the aperture in the side wall to be positioned to define an adjustable aperture for adjusting the predetermined liquid volume that the container will dispense.

7. The container of claim 6 wherein the adjustable aperture is defined by a slit in the side wall of the withdrawal chamber overlaid by an angled slit in the rotatable mounted cup.

8. The container of claim 1 wherein the deposit chamber is inside the withdrawal chamber.

9. The container of claim 8 wherein said air flow aperture and said liquid flow aperture are the same aperture in a side wall of the withdrawal chamber, wherein when the container is inverted from the fill position to the upright position, air flows from the withdrawal chamber to the deposit chamber through the aperture and liquid flows from the deposit chamber to the withdrawal chamber through the aperture until the level of liquid in the withdrawal chamber prevents air flow into the deposit chamber.

10. The container of claim 1 wherein the withdrawal chamber has an outer wall that is substantially vertical on one side and slopes outwardly on the opposite side.

11. The container of claim 1 wherein a vacuum space or other thermal insulation is situated between the deposit chamber and the withdrawal chamber.

12. The container of claim 1 wherein the predetermined volume dispensed by the container is between 5 ml and 50 ml.

13. A method for dispensing a predetermined volume of a liquid using a container according to claim 1 comprising:
  removing the base cap when the container is inverted, thereby opening the deposit chamber;
  putting liquid into the deposit chamber;
  replacing the base cap so as to seal the deposit chamber; and
  inverting the container back to the upright position, thereby dispensing the predetermined volume of the liquid into the withdrawal chamber.

14. A method for adjusting the predetermined volume dispensed by a container according to claim 6 comprising:
  removing the base cap when the container is inverted;
  rotating the cup on the bottom end of the withdrawal chamber, thereby positioning the air flow aperture so as to adjust the predetermined volume dispensed by a container; and
  replacing the base cap so as to seal the deposit chamber.

15. A container for dispensing a predetermined volume of liquid wherein when the container is an upright position it comprises:
  a liquid deposit chamber having a closed top end and an open bottom end;
  a liquid withdrawal chamber internal to the liquid deposit chamber, the withdrawal chamber having an open top end and a closed bottom end;
  a detachable base cap that seals the bottom end of the liquid deposit chamber, the cap having a cavity that allows liquid to pass between the liquid deposit and withdrawal chambers;
  an air flow aperture in a side wall of the withdrawal chamber for air to flow from the withdrawal chamber into the deposit chamber;
  a liquid flow aperture in the bottom end of the withdrawal chamber for liquid to flow from the deposit chamber into the withdrawal chamber; and
  a rotatable cup mounted to the bottom end of the withdrawal chamber, said cup having an aperture in an end wall thereof in axial alignment with said liquid flow aperture, wherein when the container is inverted from the upright position to a fill position, the cap can be detached from the deposit chamber so that the deposit chamber can be filled with liquid, wherein after re-attaching the cap, the container is inverted from the fill position to the upright position, air flows from the withdrawal chamber to the deposit chamber and liquid flows from the deposit chamber into the withdrawal chamber until the level of liquid in the withdrawal chamber prevents air flow into the deposit chamber, thereby dispensing a predetermined volume of liquid into the withdrawal chamber, and wherein the rotatable cup permits the aperture in the side wall of the withdrawal chamber to be positioned to define an adjustable aperture for adjusting the predetermined liquid volume that the container will dispense.

16. The container of claim 15 wherein the adjustable aperture is defined by a slit in the side wall of the withdrawal chamber overlaid by an angled slit in the rotatable mounted cup.

* * * * *